Jan. 21, 1964 J. G. BERGDOLL ETAL 3,118,498
HEAT EXCHANGERS
Filed Aug. 19, 1959 4 Sheets-Sheet 1

INVENTORS
JOHN G. BERGDOLL,
JOSEPH R. CHAMBERLAIN,
BY SAM P. SOLING AND
WILLARD R. ZAHN.

ATTORNEY

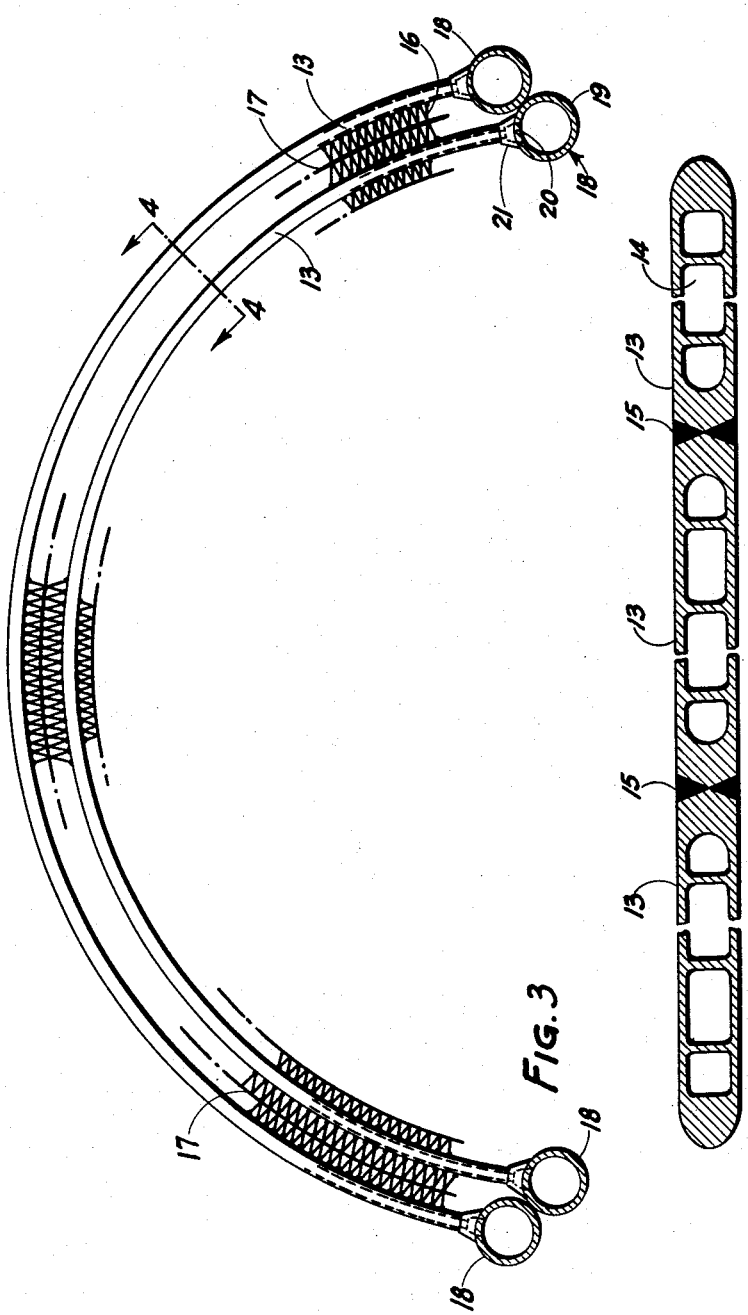

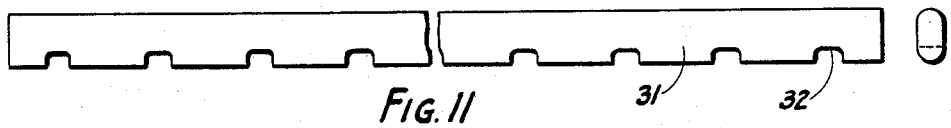
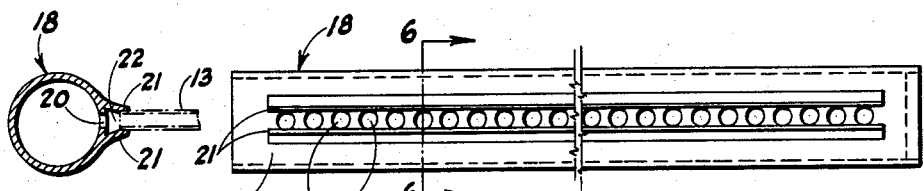
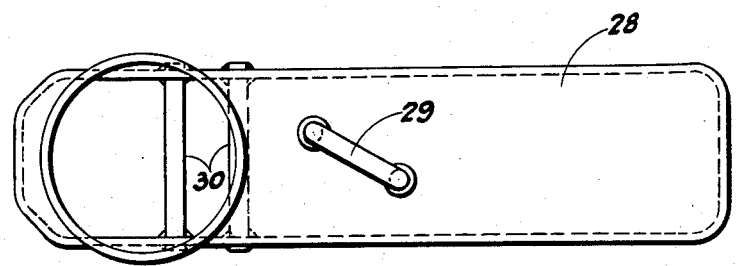
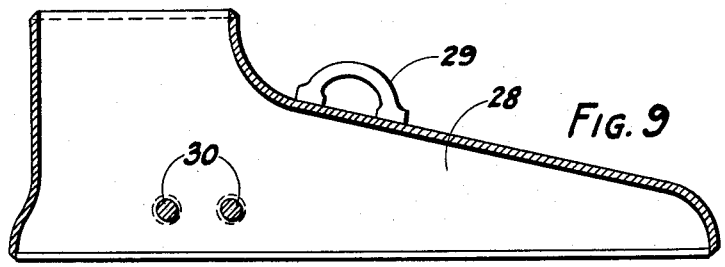
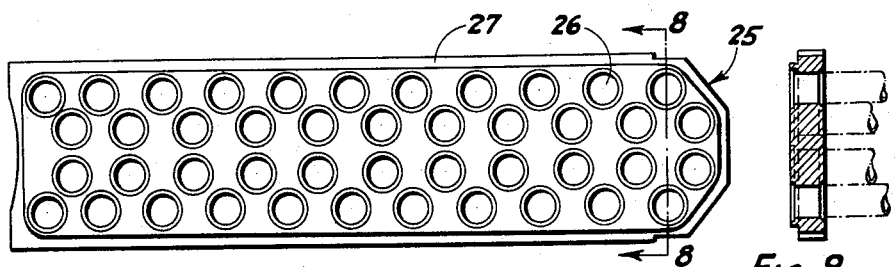

3,118,498
HEAT EXCHANGERS
John G. Bergdoll, York, Joseph R. Chamberlain, York Township, York County, Sam P. Soling, Spring Garden Township, York County, and Willard R. Zahn, West Manchester Township, York County, Pa., assignors to Borg-Warner Corporation, Chicago, Ill., a corporation of Illinois
Filed Aug. 19, 1959, Ser. No. 834,801
4 Claims. (Cl. 165—166)

This invention relates generally to heat-exchangers adapted to provide the greatest amount of heat-exchange surface in a given space. More particularly, it relates to such heat-exchangers having circular or semi-circular configuration.

An object of the invention is to provide a heat-exchange structure that is easily manufactured and assembled, of economical construction providing the greatest amount of heat-exchange surface in any given cubic space.

A further object of the invention is to provide a heat-exchange structure wherein a plurality of heat-exchange panels provide for longitudinal fluid flow paths, the panels having heat-exchange fins bonded therebetween providing fluid flow paths in cross-flow relation to said longitudinal flow paths. Another object is to provide such heat-exchange structures of semi-circular configuration wherein said panel fluid flows paths are circumferential and said heat-exchange fin flow paths are axial.

Yet another object of the invention is to provide a heat-exhange structure of circular configuration comprising two heat-exchangers of the type just above mentioned assembled in opposed relation and wherein a liquid supplied to the heat-exchange structure is divided to flow circumferentially through both heat-exchangers.

The invention consists of the novel constructions, arrangements and devices to be hereinafter described and claimed for carrying out the above-stated objects and such other objects as will appear from the following description of preferred embodiments of the invention described with reference to the accompanying drawings, in which:

FIG. 3 is a plan view, to a larger scale than FIGS. 1 and 2, of a pair of heat-exchange panels having heat-exchange fins interposed therebetween;

FIG. 4 is a sectional view taken on line 4—4 of FIG. 3 showing the internal configuration of a typical heat-exchange panel;

FIG. 5 is a front view of a tube-header adapted to be attached to a heat-exchange panel;

FIG. 6 is a sectional view taken on the line 6—6 of FIG. 5;

FIG. 7 is a plan view of a collecting plate adapted to receive various tube-headers for distributing fluid thereto;

FIG. 8 is a sectional view taken on the line 8—8 of FIG. 7;

FIGS. 9 and 10 are elevation and plan views respectively of a fluid distributing boot adapted to be mounted over the collector plate of FIG. 7; and FIG. 11 is an elevation of a tie rod used to maintain the various panels in proper spaced relationship.

Like numerals refer to like parts throughout the several views.

Figure 1:
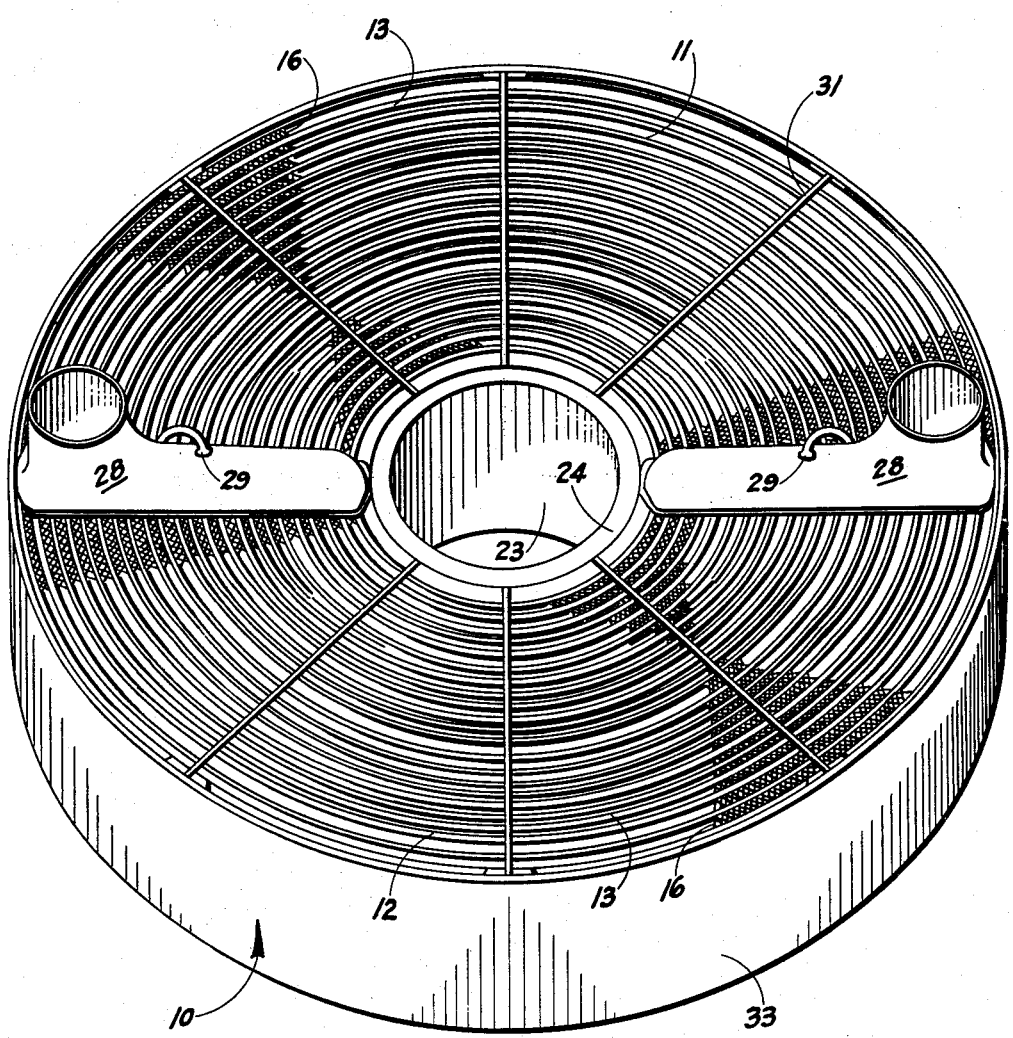
FIG. 1 is a view in perspective of a circular heat-exchange structure of the invention.
Figure 2:
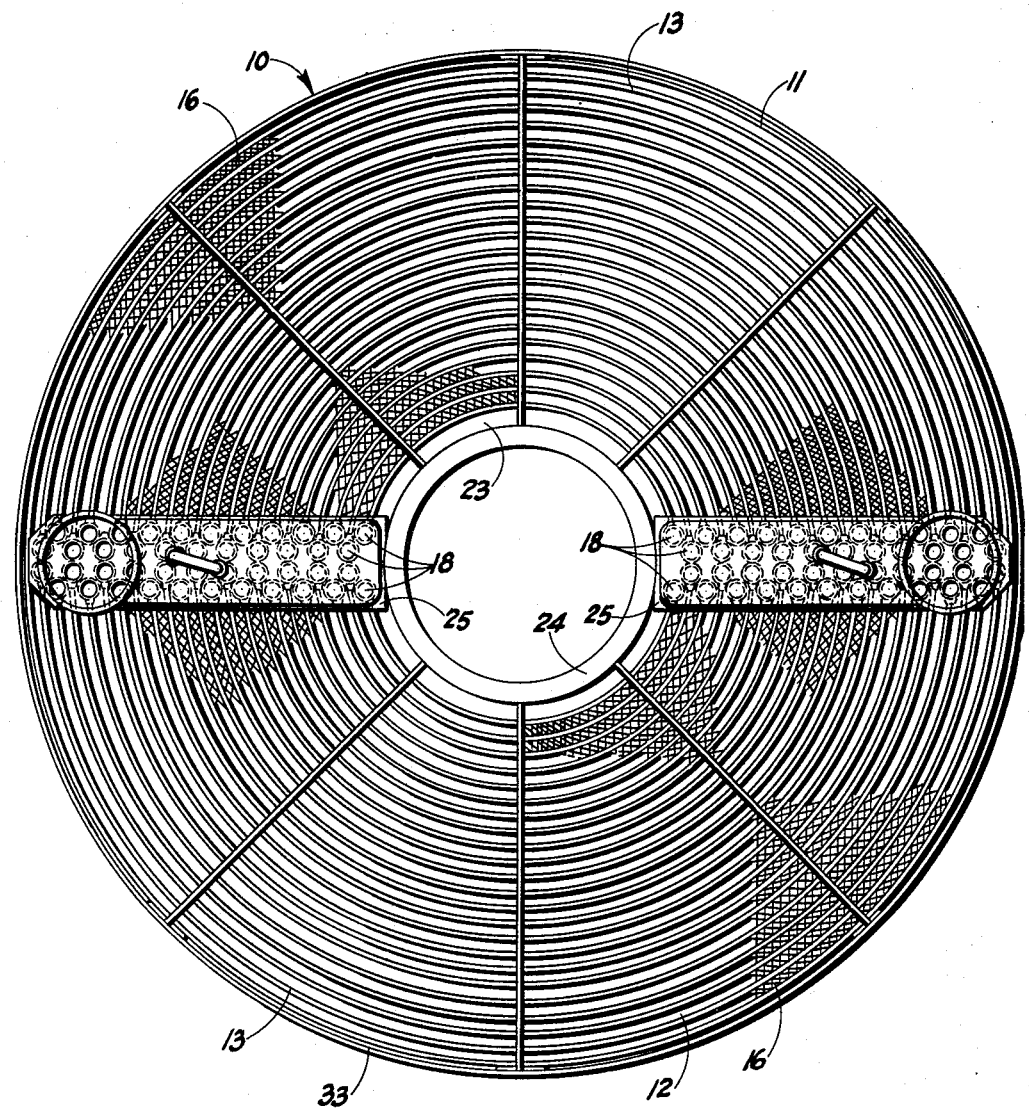
FIG. 2 is a plan view of the heat-exchange structure of FIG. 1.

Turning now to the drawings a preferred form of the invention will be described Turning specifically to FIGS. 1 and 2, assemblage 10 comprises a heat-exchanger 11 and heat-exchanger 12. Heat-exchangers 11 and 12 are mirror duplicates of one another, therefore, for the purpose of this description, duplicate parts in exchangers 11 and 12 are given the same numerals.

The heat-exchangers are composed of a plurality of arcuate panels 13 more clearly shown in FIG. 3. Panels 13 comprise a plurality of extrusions internally cored to form a plurality of passageways 14, which are preferable to a single slot for strength purposes. The extrusions are welded together, as at 15, to form the completed panel. Corrugated heat-exchange fins 16 are provided on both sides of each arcuate panel 13. Fins 16 allow for cross (axial) flow of a heated or cooled gas with respect to panels 13. A thin aluminum sheet 17 is provided between adjacent fins 16 to prevent the fins from inter-engaging.

It will be appreciated that, for the purpose of the invention, panels 13 can take the form of extrusions, castings, etc., suitable for passing liquid therethrough. Panels 13 are nested one within the other with each panel forming a semi-circle of successively smaller radius, progressing from the outermost panel to the innermost.

As can be appreciated from the drawings, panels 13 provide a fluid course for a liquid to be either cooled or heated within the heat-exchangers. It can be readily seen that the liquid flow is circumferential (longitudinal of the panels), as seen in FIGS. 1 and 2.

On either end thereof, each panel 13 is provided with a fluid header 18. Headers 18 are formed of tubes 19 open on the upper end thereof and having a plurality of slots 20 through one wall thereof. A V-shaped flange portion 21 is provided for attachment to panels 13, preferably placing slots 20 in registry with passageways 14 in panels 13. As can be noted from FIG. 6, the end of panel 13 is somewhat spaced from the wall of tube 19 defining slots 20, thereby forming a longitudinal passage 22 therebetween. This insures complete flow of fluid from slots 20 of tubes 19 into passageways 14 of panels 13 by way of passages 22, even though there be misalignment between the slots 20 and passageways 14.

The circumferential length of adjacent panels is selected such that alternate of said fluid headers 18 lie in adjacent radially directed planes such that said headers are positioned in staggered relation, as can clearly be seen in FIG. 3. This allows the headers 18 to be of larger diameter than would otherwise be possible.

The panels are assembled one within the other around an inner cylinder 23. Cylinder 23 is counterbored to receive therein a ring 24. Cylinder 23 provides the necessary rigidity and support to the entire structure. The purpose of ring 24 is to provide a gripping section for the entire assembly so that it may be picked up and handled by whatever lifting mechanism is desirable.

Exchangers 11 and 12 are assembled about cylinder 23 with their respective headers 18 in proper staggered relation, and the opposed headers 18 on both ends of the panels 13 are positioned by a tube plate 25, as shown in FIG. 7, having a plurality of apertures 26 therethrough with each aperture 26 adapted to receive its respective fluid header 18. Similar collecting plates (not shown) are positioned on the under side of headers 18 to receive the closed ends thereof. This lower collecting plate has apertures similar to apertures 26, except, however, that they do not go through the entire plate but, instead, serve merely as collecting sockets for headers 18.

The tube plates 25 are each recessed around the edges thereof, as shown at 27, to receive a fluid distributing boot 28. The configuration of boot 28 can clearly be seen in FIGS. 9 and 10, and include a handle member 29 and a pair of stiffening braces 30.

In order to help maintain the entire assembly in rigid alignment, a plurality of tie rods 31, as shown in FIG. 11, are notched as at 32, and are mounted at selected intervals along the top of the assembly. Notches 32 are so spaced along rod 31 as to each receive the upper edge of an adjacent panel 13 for attachment (as by welding) thereto. It will be appreciated that this prevents the panels from shifting toward, or away from, each other preventing any crushing of fins 16.

The entire assembly is encompassed about by a binder 33 of heavy metal, to which binder tie rods 31 are suitably attached as by welding on their outermost ends. On their innermost ends, tie rods 31 are fastened to cylinder 23 also as by welding.

Any fluid that is to be heated or cooled is led into one or the other of distributing boots 28. The boot 28 then distributes the fluid over the entire face of tube plate 25, the fluid thence flowing axially into the fluid headers 18, exiting therefrom by way of slots 20 into passageways 14, whence the fluid flows circumferentially through the various panels 13, exiting in the same manner through the opposite distributing boot 28. It will be apparent that the fluid will be subdivided, part flowing through heat-exchanger 11 and part through heat-exchanger 12. Hot or cold air or other gas is then passed axially through heat-exchange fins 16, giving up heat to, or picking up heat from the fluid flowing through panels 13.

We wish it to be understood that our invention is not to be limited to the specific constructions and arrangements shown and described, except only insofar as the claims may be so limited, as it will be apparent to those skilled in the art that changes may be made without departing from the principles of the invention.

What is claimed is:

1. A heat-exchanger comprising a plurality of arcuate internally cored panels defining circumferential fluid passageways, said panels taking the form of semi-circles of different radii nested one within the other, a plurality of corrugated fins positioned one each between said panels and bonded thereto providing axial fluid passages, a plurality of fluid headers having axially directed fluid passages attached to said free ends of said panels for distributing fluid axially of said panels for flow therethrough, the linear distance between said panels being less than the diameter of said headers, alternate of said panels terminating in a substantially radially directed plane and said panels therebetween terminating in a parallel offset plane such that said headers lie in said two planes and in staggered relation, and means attached to said fluid headers for either distributing fluid to or receiving fluid from said headers.

2. An assemblage comprising a pair of opposed heat-exchangers as set out in claim 1, and wherein said last mentioned means comprises a pair of fluid distributing boots and wherein each said boot is attached to opposed fluid headers of both said heat-exchangers.

3. A heat-exchanger comprising a plurality of arcuate internally cored panels defining circumferential fluid passageways nested one within the other, a means positioned between said panels and bonded thereto providing axial fluid passages, a plurality of fluid headers having axially directed fluid passages attached to the free ends of said panels for distributing fluid axially of said panels for flow therethrough, the linear distance between said panels being less than the diameter of said headers, alternate of said panels terminating in alternate planes such that said headers lie in said two planes and in staggered relation, and a pair of radially extending fluid distributing boots each collecting the fluid headers at the free ends of said panels.

4. A heat-exchanger comprising a plurality of arcuate internally cored panels defining circumferential fluid passageways nested one within the other, means positioned between said panels and bonded thereto providing axial fluid passages, a fluid header having an axially directed fluid passage attached to the free ends of each of said panels for distributing fluid axially of said panels for flow therethrough, the linear distance between said panels being less than the diameter of said headers, alternate of said panels terminating in two parallel planes such that said headers lie in said two planes and in staggered relation, and means attached to said fluid headers for distributing fluid to or receiving fluid from said headers.

References Cited in the file of this patent

UNITED STATES PATENTS

| | | |
|---|---|---|
| 632,506 | Allington | Sept. 5, 1899 |
| 1,329,697 | Bowman | Feb. 3, 1920 |
| 1,946,885 | Schmidt et al. | Feb. 13, 1934 |
| 1,991,194 | Child | Feb. 12, 1935 |
| 2,081,678 | Rosenblad | May 25, 1937 |
| 2,376,749 | Belaieff | May 22, 1945 |
| 2,469,028 | Belaieff | May 3, 1949 |
| 2,858,113 | Miller | Oct. 28, 1958 |

FOREIGN PATENTS

| | | |
|---|---|---|
| 581,586 | Great Britain | Oct. 17, 1946 |